US010538336B2

(12) United States Patent
Guo et al.

(10) Patent No.: US 10,538,336 B2
(45) Date of Patent: Jan. 21, 2020

(54) UNMANNED AERIAL VEHICLE

(71) Applicant: SZ DJI TECHNOLOGY CO., LTD., Shenzhen (CN)

(72) Inventors: Xiaokai Guo, Shenzhen (CN); Tao Peng, Shenzhen (CN); Liang Sun, Shenzhen (CN); Di Ou, Shenzhen (CN); Hongshan Li, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/401,854

(22) Filed: May 2, 2019

(65) Prior Publication Data
US 2019/0256215 A1 Aug. 22, 2019

Related U.S. Application Data

(63) Continuation of application No. PCT/CN2016/113338, filed on Dec. 30, 2016.

(30) Foreign Application Priority Data

Nov. 9, 2016 (CN) ...................... 2016 2 1211629 U

(51) Int. Cl.
*B64D 27/24* (2006.01)
*B64C 39/02* (2006.01)
(Continued)

(52) U.S. Cl.
CPC ............ *B64D 27/24* (2013.01); *B64C 39/024* (2013.01); *B64D 27/26* (2013.01); *B64D 35/04* (2013.01);
(Continued)

(58) Field of Classification Search
CPC ........ B64D 27/24; B64D 27/26; B64D 35/04; B64C 39/024
See application file for complete search history.

(56) References Cited

U.S. PATENT DOCUMENTS 8,235,324 B1    8/2012  Birch
9,016,617 B2 *  4/2015  Wang .................... B64C 39/024
                                                    244/17.17
(Continued)

FOREIGN PATENT DOCUMENTS

CN    102761162 A    10/2012
CN    104184195 A    12/2014
(Continued)

OTHER PUBLICATIONS

World Intellectual Property Organization (WIPO) International Search Report for PCT/CN2016/113338 dated Jul. 21, 2017 6 Pages.

*Primary Examiner* — Justin M Benedik
(74) *Attorney, Agent, or Firm* — Anova Law Group, PLLC

(57) ABSTRACT

An unmanned aerial vehicle (UAV) includes a fuselage, an electrical component, and an adapter arranged at the fuselage. The fuselage includes a battery compartment for accommodating a battery. The battery compartment includes an electrical connector for electrically coupling to the battery. The adapter is electrically coupled to the electrical connector and includes an access unit electrically coupled to the electrical connector and an adapting unit detachably coupled to the access unit. The adapting unit is configured to be electrically connected to the access unit when the adapting unit is coupled to the access unit. The adapting unit is electrically coupled to the electrical component through an adapting conductive wire to conduct power from the battery to the electrical component.

20 Claims, 4 Drawing Sheets

(51) Int. Cl.
 *B64D 27/26* (2006.01)
 *B64D 35/04* (2006.01)
(52) U.S. Cl.
 CPC .. *B64C 2201/027* (2013.01); *B64C 2201/042* (2013.01); *B64C 2201/108* (2013.01); *B64C 2201/165* (2013.01)

(56) References Cited

U.S. PATENT DOCUMENTS

| | | | |
|---|---|---|---|
| 9,139,310 B1* | 9/2015 | Wang | B64F 1/36 |
| 2005/0287851 A1* | 12/2005 | Earl | H01M 2/1072 |
| | | | 439/133 |
| 2012/0083945 A1* | 4/2012 | Oakley | B64C 27/08 |
| | | | 701/2 |
| 2014/0032034 A1* | 1/2014 | Raptopoulos | G08G 5/0069 |
| | | | 701/25 |
| 2014/0061376 A1* | 3/2014 | Fisher | B64D 27/24 |
| | | | 244/62 |
| 2015/0232181 A1* | 8/2015 | Oakley | B64C 39/024 |
| | | | 701/2 |

FOREIGN PATENT DOCUMENTS

| | | |
|---|---|---|
| CN | 205005377 U | 1/2016 |
| CN | 205186536 U | 4/2016 |
| CN | 205469856 U | 8/2016 |

* cited by examiner

UNMANNED AERIAL VEHICLE

CROSS-REFERENCE TO RELATED APPLICATIONS

This application is a continuation of International Application No. PCT/CN2016/113338, filed on Dec. 30, 2016, which claims priority to Chinese Application No. 201621211629.1, filed on Nov. 9, 2016, the entire contents of both of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the field of unmanned aerial vehicle.

BACKGROUND

In conventional technologies, unmanned aerial vehicles (UAVs) can be used in industries such as aerial photography, surveying and mapping, plant protection, detection, and disaster relief. A UAV usually includes a fuselage, a power system, a landing gear, etc., and carries a flight controller, an image transmission device, and other microcomputer device for performing tasks.

A UAV usually consumes a lot of power during operating and performing functions. A UAV is usually powered by a battery at the fuselage or an external battery. The battery outputs electrical energy through electrically conductive wires to power electrical components of the UAV. The electrical components, such as propeller assemblies, are relatively easy to be damaged or malfunction during operation. In conventional technologies, when an electrical component is damaged or a failure occurs, not only the electrical component needs to be dissembled, but also power supply electrical circuits between the electrical component and the battery need to be dissembled. However, since the power supply electrical circuits are usually arranged inside a fuselage of the UAV, the dissembling may be relatively complicated, thereby making it relatively difficult to repair or replace the damaged electrical components.

Further, under normal circumstances, a UAV is powered by a single battery. A rated capacity of a single battery is limited within a safety standard, and hence the battery life is limited. The single battery power supply results in relatively poor battery life and relatively poor stability.

SUMMARY

In accordance with the disclosure, there is provided an unmanned aerial vehicle (UAV) including a fuselage, an electrical component, and an adapter arranged at the fuselage. The fuselage includes a battery compartment for accommodating a battery. The battery compartment includes an electrical connector for electrically coupling to the battery. The adapter is electrically coupled to the electrical connector and includes an access unit electrically coupled to the electrical connector and an adapting unit detachably coupled to the access unit. The adapting unit is configured to be electrically connected to the access unit when the adapting unit is coupled to the access unit. The adapting unit is electrically coupled to the electrical component through an adapting conductive wire to conduct power from the battery to the electrical component.

DETAILED DESCRIPTION OF THE EMBODIMENTS

Figure 1:
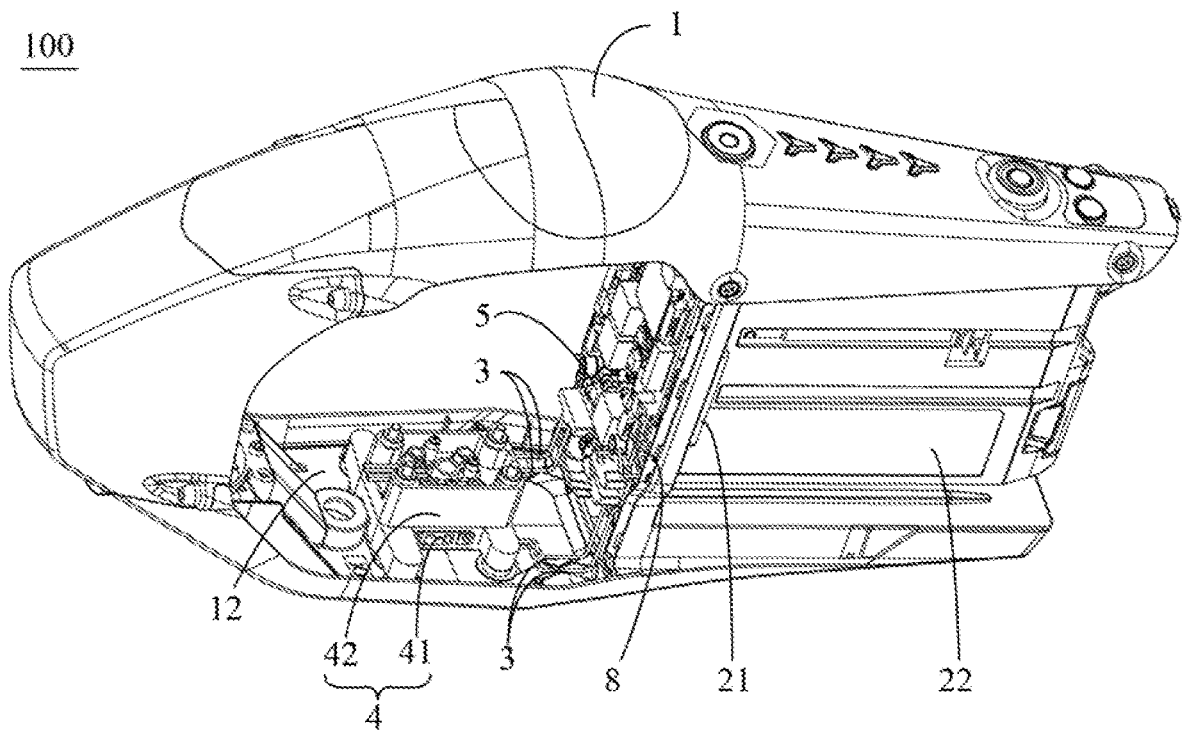
FIG. 1 is a partial structural diagram of an example unmanned aerial vehicle (UAV) consistent with various disclosed embodiments of the present disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Example embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

Referring to FIGS. 1 to 7, in some embodiments, an unmanned aerial vehicle (UAV) 100 includes a fuselage 1 and an electrical component, i.e., a component that consumes electrical power, such as a power assembly 7, which will be described in detail below. The fuselage 1 includes a battery compartment 22 for accommodating a battery. The battery compartment 22 includes an electrical connector 21 for being electrically coupled to the battery.

The UAV 100 further includes an adapter 4 arranged at the fuselage 1 and electrically coupled to the electrical connector 21. Thus, the adapter 4 is electrically coupled to the battery through the electrical connector 21. The adapter 4 includes an access unit 41 and an adapting unit 42 detachably coupled to the access unit 41. When the access unit 41 is coupled to the adapting unit 42, the access unit 41 can be electrically coupled to the adapting unit 42.

Further, the access unit 41 is electrically coupled to the electrical connector 21. The electrical power of the battery is electrically coupled to the access unit 41, and is outputted to the electrical component of the UAV 100 through the adapting unit 42. The adapting unit 42 is electrically coupled to the electrical component through an adapting conductive wire 6, such that the battery can power the electrical component.

In some embodiments, the UAV 100 may use the adapter 4 to conduct the power of the battery to the electrical component. The access unit 41 and the adapting unit 42 of the adapter 4 include detachable structures. When the circuit needs to be replaced or the electrical component is damaged or the like, the access unit 41 and the adapting unit 42 can be quickly disassembled for convenient replacement and maintenance, as described below in detail.

Figure 2:
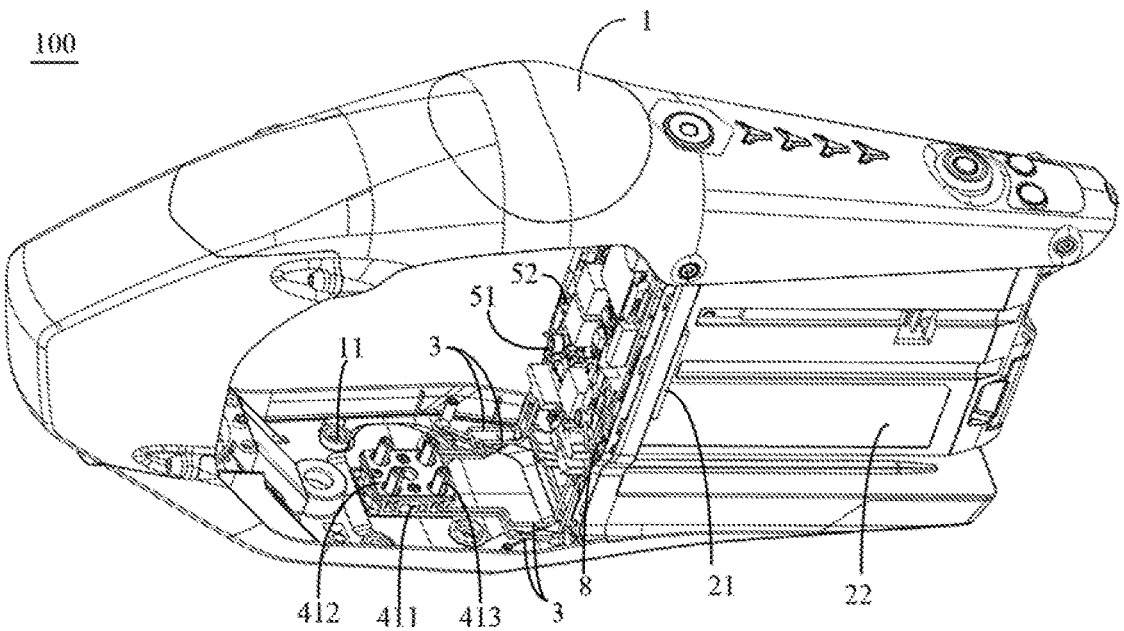
FIG. 2 is a partial structural diagram of the example UAV in FIG. 1 after an adapting unit in an adapter of the example UAV is removed consistent with various disclosed embodiments of the present disclosure.
Figure 3:
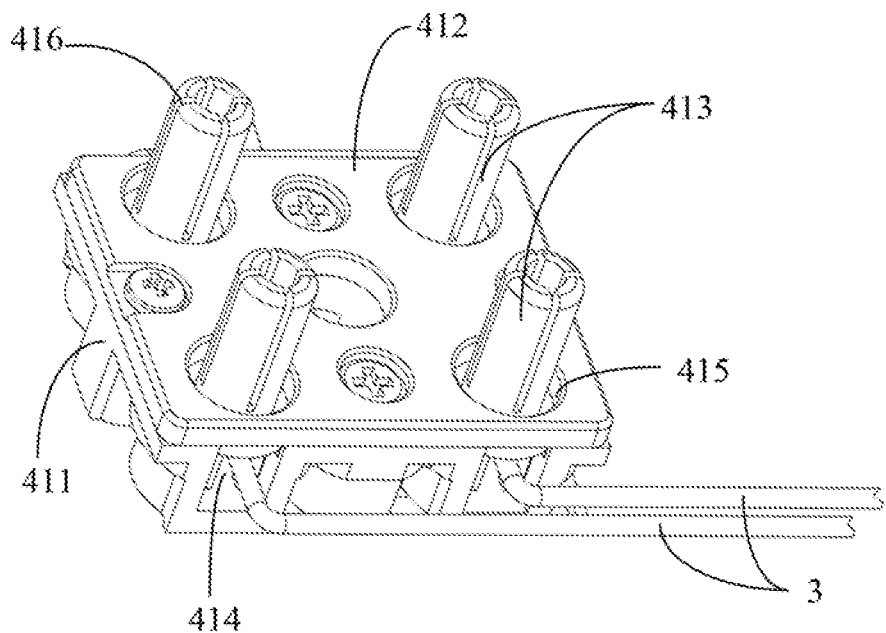
FIG. 3 is a structural diagram of an example access unit of an example UAV consistent with various disclosed embodiments of the present disclosure.
Figure 4:
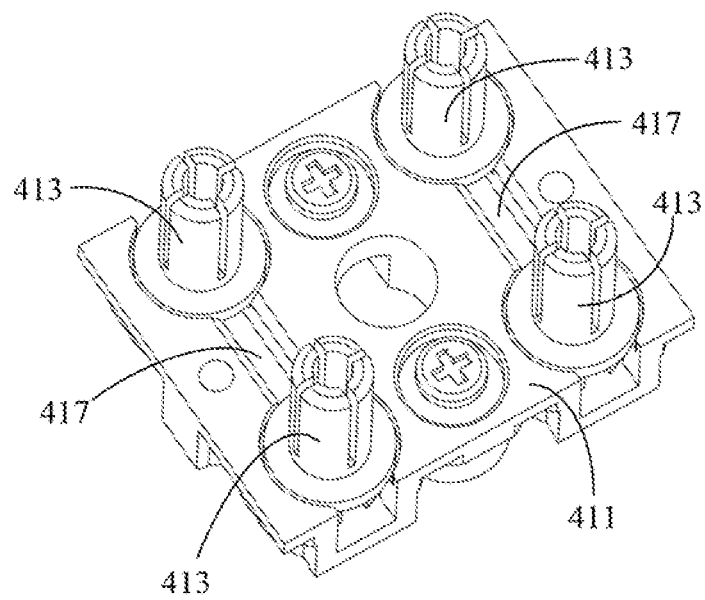
FIG. 4 is a structural diagram of another example access unit of an example UAV consistent with various disclosed embodiments of the present disclosure.

As shown in FIG. 2 to FIG. 4, the access unit 41 includes a base 411, and a conductive post 413 arranged at the base 411 and electrically coupled to the electrical connector 21.

In some embodiments, the base 411 includes one or more mounting holes 414, and a bottom end of the conductive post 413 is arranged in the mounting hole 414. The bottom end of the conductive post 413 is electrically coupled to the electrical connector 21 through an adapting conductive wire 3, and the adapter 4 is electrically coupled to the battery. A fixing plate 412 for fixing the conductive post 413 is arranged at the base 411, and one or more fixing holes 415 are arranged at the fixing plate 412. The conductive post 413 passes through the fixing hole 415 and is fixed at the fixing plate 412. The fixing plate 412 is securely coupled to the base 411 by screws, to prevent the conductive post 413 from shaking or moving in the mounting hole 414.

In some embodiments, four conductive posts 413 are provided, each of which is electrically coupled to one of two batteries. Adjacent two of the four conductive posts 413 are coupled to each other through a conductive wire 417, such that the power lines for the two batteries are coupled to each other in parallel. That is, the two conductive posts 413, i.e., the two adjacent conductive posts 413, are coupled to cathode power supply lines of the two batteries, respectively, and the other two conductive posts 413 are coupled to anode power supply lines of the two batteries, respectively. The two conductive posts 413 coupled to the cathode power supply lines are coupled to each other through a conductive wire 417, and the other two conductive posts 413 coupled to the anode power supply lines are coupled to each other through another conductive wire 417.

Figure 5:
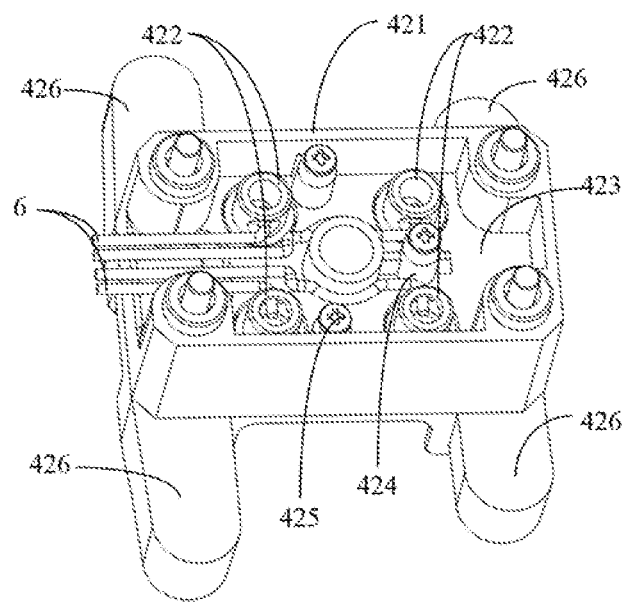
FIG. 5 is a structural diagram of an example adapting unit of an example UAV consistent with various disclosed embodiments of the present disclosure.
Figure 6:
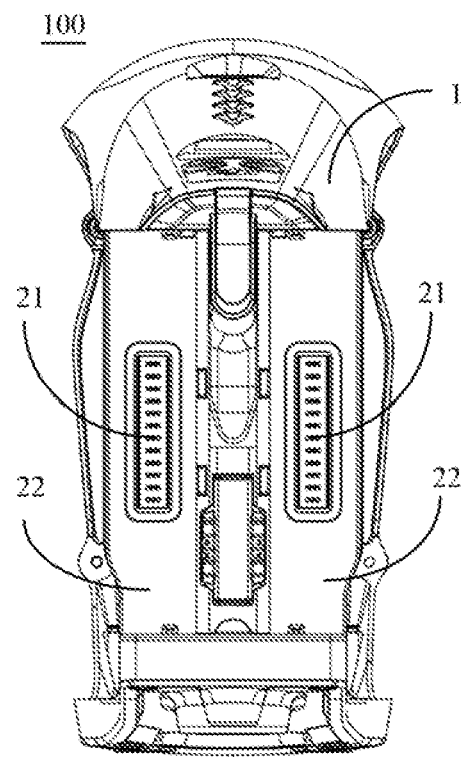
FIG. 6 is a structural diagram of an example fuselage and an example power assembly of an example UAV consistent with various disclosed embodiments of the present disclosure.

As shown in FIG. 5, the adapting unit 42 includes a body 421 and adapting terminals 422 arranged at the body 421. The adapting terminal 422 matches and is electrically coupled to the conductive post 413. Adapting conductive wires 6 are electrically coupled to the adapting terminals 422.

The body 421 includes an accommodating space 423, and the adapting terminals 422 are fixed in the accommodating space 423. The adapting unit 42 further includes a cover plate (not shown) arranged over the adapting terminals 422 and fixed to the body 421. The cover plate is fixed at screw columns 424 of the body 421 through screws 425 to cover or protect the conductive posts 413.

Further, as shown in FIG. 3, the conductive post 413 includes a pre-tightening member 416. The pre-tightening member 416 is coupled to the adapting terminal 422 and generates a pre-tightening force. The pre-tightening member 416 include an end of the conductive post 413 with four vertical openings. An outer diameter of the pre-tightening member 416 of the conductive post 413 is larger than an inner diameter of the adapting terminal 422. In some embodiments, an inner diameter of the pre-tightening member 416 of the conductive post 413 is larger than an inner diameter of the adapting terminal 422. When the adapting terminal 422 is coupled to the pre-tightening member 416 of the conductive post 413, a pre-tightening force is generated. A lower end of the adapting terminal 422 is coupled to, e.g., sleeved on, the pre-tightening member 416, and an upper end of the adapting terminal 422 is coupled to the adapting conductive wire 6.

Further, as shown in FIGS. 2 to 5, the body 421 includes a connection member 426. The fuselage 1 or the base 411 includes a positioning member 11 matching the connection member 426. As the connection member 426 and the positioning member 11 are coupled to each other, the adapting unit 42 is positioned and held by the fuselage 1 or the base 411.

In some embodiments, the connection member 426 may include a portion extending outwardly from the body 421. The positioning member 11 may include a positioning hole at the fuselage 1, and the connection member 426 may match the positioning hole and hence be fixed at the fuselage 1. As the connection member 426 matches with the positioning member 11, the adapting unit 42 may be fixed in position and held by the fuselage 1, the adapting terminal 422 of the adapting unit 42 may be coupled to the conductive post 413 of the access unit 41 in a sleeve style.

Further, as shown in FIG. 1, the fuselage 1 includes an accommodating space 12 expanding between two sides of the fuselage 1, i.e., the accommodating space 12 is across the fuselage 1 between the two sides of the fuselage 1. The adapter 4 is arranged in the accommodating space 12. Arranging the accommodating space 12 may facilitate maintenance and replacement of the adapter 4. That is, the access unit 41 and/or the adapting unit 42 of the adapter 4 may be relatively conveniently removed from the accommodating space 12.

Figure 7:
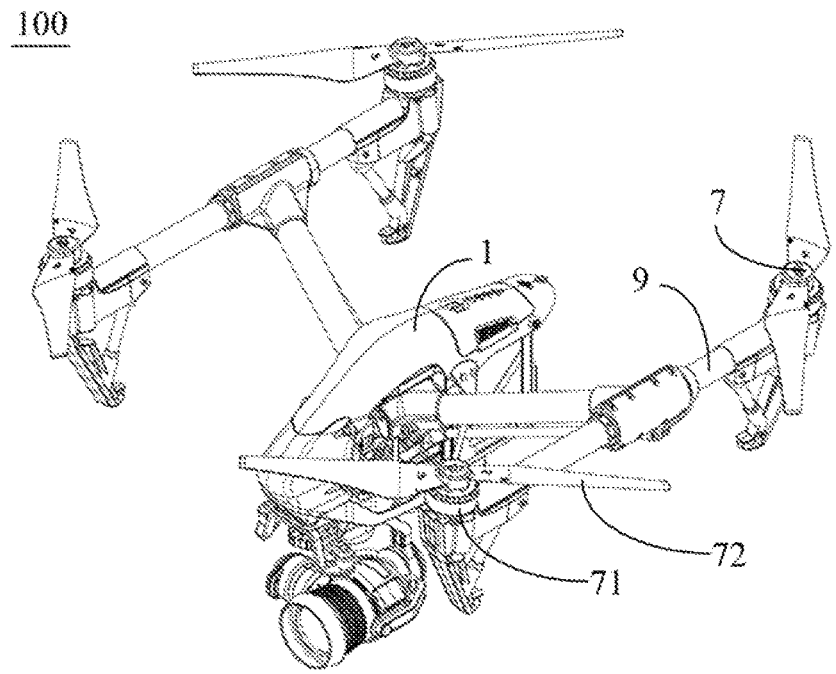
FIG. 7 is an overall schematic diagram of an example UAV consistent with various disclosed embodiments of the present disclosure.

As shown in FIG. 7, the electrical component includes a power assembly 7. The power assembly 7 includes a motor 71 for driving a propeller 72 to rotate, and an electronic speed controller (ESC) (not shown) electrically coupled to the motor 71 for controlling rotation of the motor 71. The ESC is electrically coupled to the adapting unit 42 through the adapting conductive wire 6. The UAV 100 further includes an arm 9, and the motor 71 is arranged at the arm 9.

In some embodiments, the power assembly 7 includes a propeller assembly. The propeller assembly includes the motor 71 for driving rotation of the propeller 72, and an ESC that is electrically coupled to the motor 71 and is configured to control rotation of the motor 71. The arm 9 includes a hollow structure. The adapting conductive wire 6 is arranged in the arm 9 and is electrically coupled to the motor 71. In some embodiments, the adapting conductive wire 6 may be arranged at the arm 9, and the arm 9 may include a groove, a fixing structure, or the like for arranging the adapting conductive wire 6.

In some embodiments, the electrical component may include a gimbal motor, a photographing device, etc. When a connection line or a component of the above-described electrical component coupled to the adapting unit 42 needs to be replaced, the adapting unit 42 may be removed, and further the connection line coupled to the electrical component may be removed from the arm 9 or other component, for convenient operation. In some embodiments, the electrical component may also include a flight controller of, various sensors, and/or various electrical signal units of the UAV.

As shown in FIG. 2, the UAV 100 further includes a battery power supply board 8 arranged at the fuselage 1 and matching the electrical connector 21. The battery power supply board 8 is electrically coupled to the access unit 41 through an output conductive wire 3.

Referring to FIGS. 2 to 7, there can be a plurality of battery compartments 22, and each of the battery compartments 22 accommodates one of the batteries. At least one of the battery power supply board 8, the access unit 41, or the adapting unit 42 electrically connects power lines for the plurality of batteries in parallel.

In some embodiments, the UAV may include two batteries, and two battery compartments 22. The two battery compartments 22 are arranged on two sides of the fuselage 1, respectively. The two batteries are arranged in the two battery compartments 22 on the two sides of the fuselage 1, respectively, and are coupled to the electrical connector 21. Two battery compartments 22 are arranged at a rear end of the fuselage 1, and each of the battery compartments 22 accommodates one of the two batteries. The two batteries are electrically coupled to each other in parallel to provide power for the electrical component of the UAV. Through at least one of the battery power supply board 8, the access unit 41, or the adapting unit 42, the power lines for the two batteries can be electrically coupled to each other in parallel. The use of multiple batteries to power the UAV can improve stability and reliability of the power supply system of the UAV 100, and improve battery power duration of the UAV 100.

Further, as shown in, e.g., FIGS. 1, 2, and 7, the UAV 100 also includes a fuselage center board 5 arranged at the fuselage 1 and at a same side as the battery power supply board 8. A signal power supply connection unit 51 and a signal communication connection unit 52 are arranged at the fuselage center board 5. The signal power supply connection unit 51 is electrically coupled to the battery power supply board 8. The battery provides weak electricity to the fuselage center board 5 through the battery power supply board 8. The battery provides a large voltage current to the electrical component through the adapter 4. In some embodiments, the voltage provided by the battery power supply board 8 to the signal power supply connection unit 51 is lower than the voltage provided by the battery power supply board 8 to the access unit 41.

In some embodiments, the UAV 100 includes a fuselage center board 5 electrically coupled to the battery power supply board 8. The fuselage center board 5 is configured to distribute battery power to various sensors of the UAV 100. For example, the UAV may include a visual sensor, an ultrasonic sensor, a radar sensor, and/or the like, and the power supplied from the battery may be distributed, through the fuselage center board 5, to various above-described sensors.

In some embodiments, the UAV 100 may include a multi-rotor UAV, e.g., one of a four-rotor UAV, a six-rotor UAV, or an eight-rotor UAV. In these embodiments, the electrical component may refer to a power assembly of the multi-rotor UAV.

Figure 8:
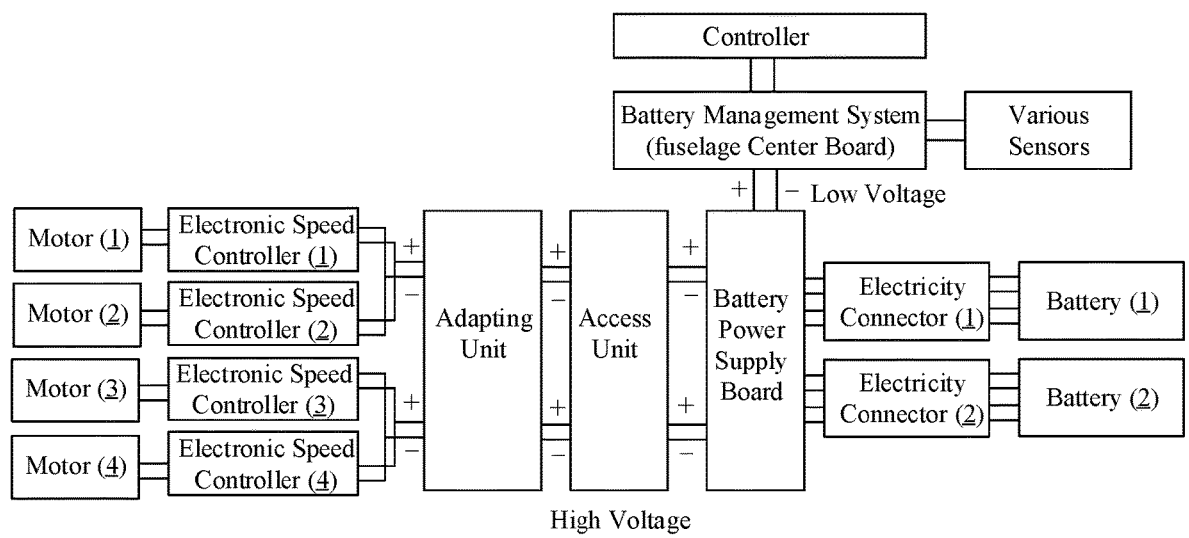
FIG. 8 illustrates power supplying of an example UAV consistent with various disclosed embodiments of the present disclosure.

FIG. 8 shows a diagram to further illustrate the UAV 100 consistent with the disclosure. As shown in FIG. 8, in some embodiments, the UAV include 4 motors and 2 batteries, as an example. A controller of the UAV, i.e., a main control system of the UAV, is coupled to a battery management system, i.e., the fuselage center board 5. The battery management system is coupled to various sensors and the battery power supply board 8. The battery power supply board 8 is coupled to a battery (1) through an electrical connector (1), and a battery (2) through an electrical connector (2). An electrical connector can also be referred to as a "battery connector." The battery power supply board 8 couples the power of the two batteries to the adaptor 4. An access unit 41 of the adaptor 4 is electrically coupled to an adapting unit 42 of the adaptor 4. The adapting unit 42 provides power to the motor 71 of the power assembly 7. That is, the adapting unit 42 are coupled to ESC (1), ESC (2), ESC (3), and ESC (4). The ESC (1) is coupled to a motor (1), the ESC (2) is coupled to a motor (2), the ESC (3) is coupled to a motor (3), and the ESC (4) is coupled to a motor (4). The battery management system provides low-voltage power to the battery power supply board 8, and the battery power supply board 8 provides high-voltage power to the access unit 41. Symbols "+" and "−" in FIG. 8 indicate positive and negative electricities, respectively.

An adaptor in the UAV consistent with the present disclosure may output battery power to an electrical component of the UAV. An access unit and an adapting unit of the adapter may include a quick-dissembling structure. Thus, when the electrical component is damaged, it is relatively convenient to perform replacement and maintenance.

Further, stable and balanced power supply and stable mutual communication of the dual battery or multi-battery system can be realized, thereby improving stability of the power supply of the UAV system, and increasing the battery duration of UAV, as compared to conventional technologies.

Other embodiments of the disclosure will be apparent to those skilled in the art from consideration of the specification and practice of the embodiments disclosed herein. It is intended that the specification and examples be considered as example only and not to limit the scope of the disclosure, with a true scope and spirit of the invention being indicated by the following claims.

What is claimed is:

1. An unmanned aerial vehicle (UAV) comprising:
   a fuselage including a battery compartment for accommodating a battery, the battery compartment including an electrical connector for electrically coupling to the battery;
   an electrical component; and an adapter arranged at the fuselage and electrically coupled to the electrical connector, the adapter including:
an access unit electrically coupled to the electrical connector; and
an adapting unit detachably coupled to the access unit, the adapting being configured to be electrically connected to the access unit when the adapting unit is coupled to the access unit, and the adapting unit being electrically coupled to the electrical component through an adapting conductive wire to conduct power from the battery to the electrical component.

2. The UAV according to claim 1, wherein the access unit includes:
a base; and
a conductive post arranged at the base and electrically coupled to the electrical connector.

3. The UAV according to claim 2, wherein the access unit further includes a fixing plate arranged at the base and configured to fix the conductive post.

4. The UAV according to claim 3, wherein the fixing plate includes a fixing hole, and the conductive post passes through the fixing hole.

5. The UAV according to claim 2, wherein:
the adapting unit includes:
a body; and
an adapting terminal at the body, the adapting terminal matching and being electrically coupled to the conductive post; and
the adapting conductive wire is electrically coupled to the adapting terminal.

6. The UAV according to claim 5, wherein the conductive post includes a pre-tightening member coupled to the adapting terminal and configured to generate a pre-tightening force.

7. The UAV according to claim 5, wherein:
the body includes a connection member;
one of the fuselage and the base includes a positioning member matching the connection member; and
when the connection member and the positioning member are coupled to each other, the adapting unit is positioned and held by the one of the fuselage and the base.

8. The UAV according to claim 5, wherein:
the body includes an accommodating space; and
the adapting terminal is fixed in the accommodating space.

9. The UAV according to claim 5, wherein the adapting unit further includes a cover plate arranged over the adapting terminal and fixed to the body.

10. The UAV according to claim 5, wherein:
the fuselage includes an accommodating space expanding between two sides of the fuselage; and
the adapter is arranged in the accommodating space.

11. The UAV according to claim 2, wherein:
the conductive post is one of four conductive posts of the access unit and the battery is one of two batteries configured to provide power to the UAV; and
each of the four conductive posts is coupled to one of the two batteries.

12. The UAV according to claim 11, wherein adjacent two of the four conductive posts are coupled to each other through a conductive wire.

13. The UAV according to claim 1, wherein the electrical component includes a power assembly, the power assembly including:
a motor configured to drive a propeller to rotate; and
an electronic speed controller electrically coupled to the motor and configured to control rotation of the motor, the electronic speed controller being electrically coupled to the adapting unit through the adapting conductive wire.

14. The UAV according to claim 13, further comprising:
an arm including a hollow structure,
wherein:
the motor is arranged at the arm, and
the adapting conductive wire is arranged in the arm and is coupled to the motor.

15. The UAV according to claim 1, further comprising:
a battery power supply board arranged at the fuselage and matching the electrical connector, the battery power supply board being coupled to the access unit through an output conductive wire.

16. The UAV according to claim 15,
wherein the battery compartment is a first battery compartment and the battery is a first battery;
the UAV further comprising:
a second battery compartment for accommodating a second battery;
wherein power lines for the first battery and the second battery are coupled to each other in parallel through at least one of the battery power supply board, the access unit, or the adapting unit.

17. The UAV according to claim 15,
wherein the battery compartment is a first battery compartment and the battery is a first battery;
the UAV further comprising:
a second battery compartment for accommodating a second battery electrically coupled to the electrical connector;
wherein the first battery compartment and the second battery compartment are arranged on two sides of the fuselage, respectively.

18. The UAV according to claim 15, further comprising:
a fuselage center board at the fuselage and on a same side as the battery power supply board, the fuselage center board including a signal power supply connection unit electrically coupled to the battery power supply board;
wherein a voltage provided by the battery power supply board to the signal power supply connection unit is lower than a voltage provided by the battery power supply board to the access unit.

19. The UAV according to claim 1, further comprising:
a fuselage center board electrically coupled to a battery power supply board and configured to distribute battery power to a plurality of sensors of the UAV.

20. The UAV according to claim 1, wherein the UAV is a multi-rotor UAV.

* * * * *